United States Patent
DeCusatis et al.

(10) Patent No.: US 9,509,627 B2
(45) Date of Patent: *Nov. 29, 2016

(54) RESOURCE OVER-SUBSCRIPTION

(71) Applicant: International Business Machines Corporation, Armonk, NY (US)

(72) Inventors: Casimer DeCusatis, Poughkeepsie, NY (US); Sujatha Kashyap, Austin, TX (US); Rajaram B. Krishnamurthy, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/501,305

(22) Filed: Sep. 30, 2014

(65) Prior Publication Data

US 2015/0172209 A1 Jun. 18, 2015

Related U.S. Application Data (63) Continuation of application No. 14/104,738, filed on Dec. 12, 2013.

(51) Int. Cl.
*H04L 12/911* (2013.01)
*H04L 12/26* (2006.01)
(Continued)

(52) U.S. Cl.
CPC ......... *H04L 47/70* (2013.01); *G06F 17/30153* (2013.01); *H04L 43/0823* (2013.01); *H04L 47/11* (2013.01); *H04L 47/30* (2013.01)

(58) Field of Classification Search
CPC . H04L 47/10; H04L 47/12; H04L 47/06027; H04L 47/263; H04L 47/38; H04L 47/29; H04L 69/04; H04L 12/2876; H04L 65/80; H04L 65/605; H04L 47/5602; H04L 47/26; H04L 47/5695; H04L 47/5601; H04L 47/30; H04L 47/20; H04L 47/822; H04L 47/15; H04L 47/762; H04L 47/2441; H04L 49/505; H04L 43/08; H04L 41/0686; H04L 41/0681; H04L 41/069; H04L 47/93; H04L 47/70; H04L 47/11; H04L 43/0823; G06F 3/0647; G06F 3/067; G06F 17/30153; H04Q 11/0478; H04W 24/00; H04W 28/10; H04N 21/4621; H04N 21/4424; H04N 21/44245; H04N 21/4402
USPC .......................... 709/224, 226; 370/229, 235
See application file for complete search history.

(56) References Cited

U.S. PATENT DOCUMENTS 5,822,700 A 10/1998 Hult et al.
6,535,484 B1 * 3/2003 Hughes et al. ............... 370/230
(Continued)

OTHER PUBLICATIONS

Wang et al., "c-Through: Part-time Optics in Data Centers", Aug. 30, 2010, Sigcomm 2010.*
(Continued)

*Primary Examiner* — Jeffrey R Swearingen
*Assistant Examiner* — Todd L Barker
(74) *Attorney, Agent, or Firm* — Cantor Colburn LLP; Steven Chiu (57) ABSTRACT

Embodiments include a method, system, and computer program product for managing workloads in a network. A switch receives data associated with a workload. The received data is tagged with an identifier that associates the data with the workload. The received data is compressed based on determining that second data stored in a buffer of the switch exceeds a threshold. The switch stores the compressed data in the buffer. The compressed data is transmitted to a second network based on a determination that the switch is over-subscribed.

12 Claims, 4 Drawing Sheets

(51) Int. Cl.
  *G06F 17/30* (2006.01)
  *H04L 12/801* (2013.01)
  *H04L 12/835* (2013.01)

(56) References Cited

U.S. PATENT DOCUMENTS

| | | | |
|---|---|---|---|
| 6,577,596 B1 | 6/2003 | Olsson et al. | |
| 6,765,873 B1 | 7/2004 | Fichou et al. | |
| 7,065,087 B2 | 6/2006 | Koren et al. | |
| 7,746,801 B2* | 6/2010 | Mathieu | H04L 12/24 370/252 |
| 7,936,675 B2* | 5/2011 | Bailey et al. | 370/232 |
| 7,957,284 B2 | 6/2011 | Lu et al. | |
| 8,031,607 B2 | 10/2011 | Rochon et al. | |
| 8,125,904 B2 | 2/2012 | Lund | |
| 8,279,935 B2 | 10/2012 | Belyaev et al. | |
| 8,291,106 B2* | 10/2012 | Yazaki et al. | 709/232 |
| 8,369,324 B1* | 2/2013 | Breight | H04L 47/38 370/389 |
| 8,370,496 B1* | 2/2013 | Marr | 709/226 |
| 8,392,575 B1* | 3/2013 | Marr | 709/226 |
| 8,416,788 B2 | 4/2013 | Colville et al. | |
| 8,451,718 B2 | 5/2013 | Kishore et al. | |
| 8,539,094 B1* | 9/2013 | Marr | 709/235 |
| 8,693,374 B1 | 4/2014 | Murphy et al. | |
| 8,824,294 B2* | 9/2014 | Halabi et al. | 370/235 |
| 8,867,361 B2 | 10/2014 | Kempf et al. | |
| 8,902,769 B1* | 12/2014 | Dehghan | H04L 12/26 370/252 |
| 9,065,749 B2* | 6/2015 | Cohen | H04L 45/125 |
| 2008/0056273 A1 | 3/2008 | Pelletier et al. | |
| 2009/0080334 A1 | 3/2009 | DeCusatis et al. | |
| 2009/0116503 A1 | 5/2009 | Sebastian | |
| 2010/0046424 A1 | 2/2010 | Lunter et al. | |
| 2011/0158248 A1* | 6/2011 | Vorunganti et al. | 370/412 |
| 2011/0242972 A1 | 10/2011 | Sebire et al. | |
| 2012/0151056 A1* | 6/2012 | Sporel | H04L 45/02 709/225 |
| 2013/0003546 A1 | 1/2013 | Matthews et al. | |
| 2014/0003422 A1* | 1/2014 | Mogul | H04L 41/069 370/389 |
| 2014/0064066 A1* | 3/2014 | Lumezanu | H04L 47/12 370/229 |
| 2014/0112128 A1 | 4/2014 | Kwan et al. | |
| 2014/0169158 A1* | 6/2014 | Mishra | H04L 69/04 370/228 |
| 2014/0185450 A1 | 7/2014 | Luo et al. | |
| 2015/0039744 A1 | 2/2015 | Niazi et al. | |
| 2015/0127805 A1 | 5/2015 | Htay et al. | |
| 2015/0195368 A1* | 7/2015 | Bandyopadhyay | H04L 43/0805 709/219 |
| 2015/0304441 A1* | 10/2015 | Ichien | H03M 7/6094 709/247 |

OTHER PUBLICATIONS

Al-Fares et al., "Hedera: Dynamic Flow Scheduling for Data Center Networks", Apr. 2010, Proc. 7th USENIX NSDI.*

Farrington et al., "A hybrid electrical/optical switch architecture for modular data centers", Aug. 2010, ACM SIGCOMM.*

Schares et al., "A reconfigurable interconnect fabric with optical circuit switch and software optimizer for stream computing systems", Mar. 2006, Optical Fiber Comm. Conference (OFC).*

Dutta, Debo, et al. "A Mechanism to Improve Performance in Mapreduce/Hadoop Clouds", ip.com, 2012, Cisco Systems, Inc., 3 pages.

Yong, Mark et al., "Towards a Resource Aware Scheduler in Hadoop", Computer Science and Engineering University of Michigan, Ann Arbor Dec. 21, 2009, 10 pages.

* cited by examiner

RESOURCE OVER-SUBSCRIPTION

DOMESTIC PRIORITY

This application is a continuation of U.S. patent application Ser. No. 14/104,738, filed Dec. 12, 2013, the disclosure of which is incorporated by reference herein in its entirety.

BACKGROUND

The present invention relates generally to computing technology, and more specifically, to resource over-subscription.

Data centers may be configured to process large amounts or volumes of data. In the context of processing large amounts of volumes of data, a map-reduce algorithm may be used. The map-reduce algorithm may entail a mapping of a large data set into smaller data sets or workloads. The workloads may be processed by a plurality of machines, virtual machines, or threads, potentially in parallel, to obtain sub-processed results. The sub-processed results may ultimately be merged or combined to obtain overall results.

In the context of network computing, a resource, such as a switch, may enter a so-called "over-subscribed" state. Succinctly stated, the switch may be over-subscribed if the input data or load required to be processed or handled by the switch exceeds the output capacity of the switch. An over-subscribed resource may represent a bottleneck in a network.

To address over-subscription, additional resources (e.g., additional switches) may be allocated. However, allocating additional resources represents additional cost in terms of, e.g., money, complexity, management, etc. Moreover, over-subscription may represent a dynamic or transient condition. Thus, the additional resources may be idle a majority of the time, resulting in an underutilization of the resources. As such, a network provider or operator may elect to forego allocating the additional resources. However, if not addressed, over-subscription may result in a loss of data (e.g., data packets). A loss of data may be reflected in terms of degraded network quality or reliability.

SUMMARY

Embodiments include a method, system, and computer program product for managing workloads in a network. A switch receives data associated with a workload. The received data is tagged with an identifier that associates the data with the workload. The received data is compressed based on determining that second data stored in a buffer of the switch exceeds a threshold. The switch stores the compressed data in the buffer. The compressed data is transmitted to a second network based on a determination that the switch is over-subscribed.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

In accordance with one or more embodiments, systems, apparatuses, and methods are described that address over-subscription of a network resource, such as a switch. Buffers associated with the switch are monitored to determine when input data to be processed by the switch exceeds a threshold. When the input data exceeds the threshold, the data may be compressed and tagged with a unique identifier. The unique identifier distinguishes the source or workload from which the data originates. The compressed, tagged data is transmitted on one or more output links of the switch. The compressed data takes up less bandwidth of the output link(s) than an uncompressed version of the data. In some embodiments, data (e.g., compressed data) may be provided by a switch to a management network for handling or processing in order to leverage bandwidth available in the management network.

Figure 1:
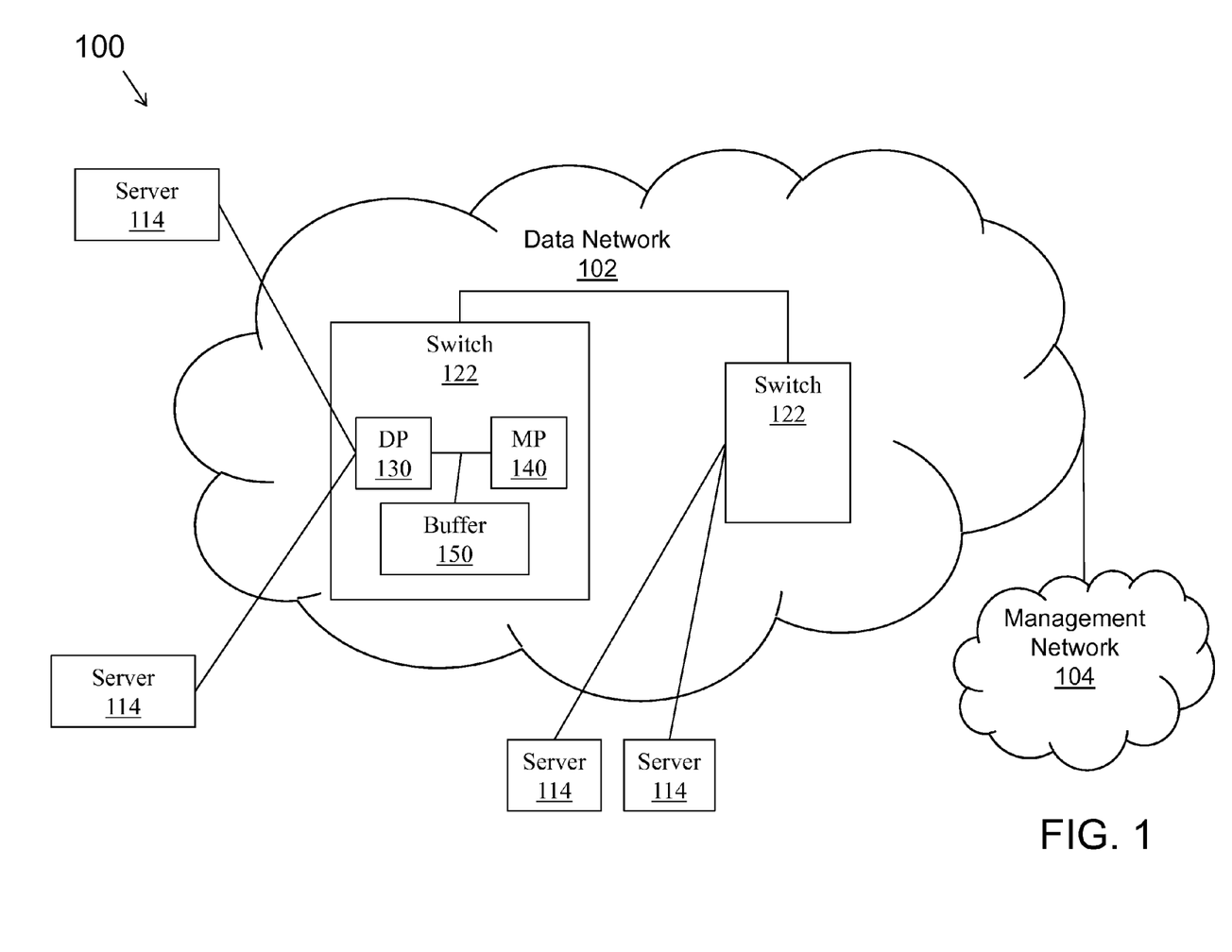
FIG. 1 depicts a computing system environment in accordance with an embodiment.

Turning now to FIG. 1, a computing system 100 is generally shown. The system 100 may be associated with one or more networks, such as a data network 102, a management network 104, etc. The networks may be coupled to one another.

The system 100 may include a number of different types of computing devices. For purposes of illustrative simplicity and ease of explanation, the system 100 is shown as including a number of servers 114 and a number of switches 122. A skilled artisan would appreciate that other types of devices may be included in some embodiments.

In some embodiments, the switches 122 may be coupled to one another. For example, data may traverse one or more switches 122, and potentially one or more of the servers 114, as part of a multi-hop path.

The servers 114 may be coupled to one or more ports of the switches 122. For example, the servers 114 may be coupled to data ports (DPs) 130 of the switches 122. A DP 130 may generally be used as a principal port to convey data between a server 114 and a switch 122. A DP 130 may be coupled to one or more management ports (MPs) 140. The role of the MP 140 is described further below.

As data is provided from a server 114 to a switch 122, potentially as part of a so-called "shuffle phase" of a map-reduce algorithm, the switch 122 may buffer the data via one or more buffers 150. The buffer 150 may be used to provide the switch 122 additional time to process or handle incoming data. Such additional time may be needed in the event that the volume of incoming data exceeds the capacity of the switch 122 to process that data. Use of the buffer 150 may help to avoid or minimize data loss.

In some embodiments, the state of the buffer 150 may be monitored. Such monitoring may occur at one or more entities. For example, the switch 122 may monitor the state of its own buffer 150. In some embodiments, the state of the buffer 150 may be monitored via the management network 104 (potentially in association with the MP 140).

The processing or handling of the incoming data at a switch 122 may be a function of the state of the buffer 150. For example, if the incoming data stored in the buffer 150 for handling or processing by the switch 122 exceeds a threshold, then the switch 122 may compress the data and may tag the data with a unique identifier (ID). The ID may identify the source or origin of the data in terms of a workload, in order to allow final results of handling or processing to be associated with a given task. On the other hand, if the incoming data stored in the buffer 150 is less than the threshold, the switch might not compress the data.

The threshold used to determine whether to compress the data may be a function of one or more parameters. For example, throughput requirements (e.g., the amount of data processed or handled per unit time), an anticipated maximum rate of incoming data at the switch 122, and a capacity of the buffer 150 may be considered in selecting the threshold. Moreover, the selected threshold may be dynamic in nature and may change based on one or more considerations or factors.

Compressed data may consume less bandwidth on an output link of a switch 122 relative to an uncompressed version of the data. On the other hand, compression represents an additional task that increases latency in terms of the time it takes for the data to arrive at a final destination (e.g., a server 114) and/or for a final result of the processing of the data to be generated. Accordingly, the selection of the threshold described above may take the trade-off between bandwidth and latency into consideration.

Figure 2:
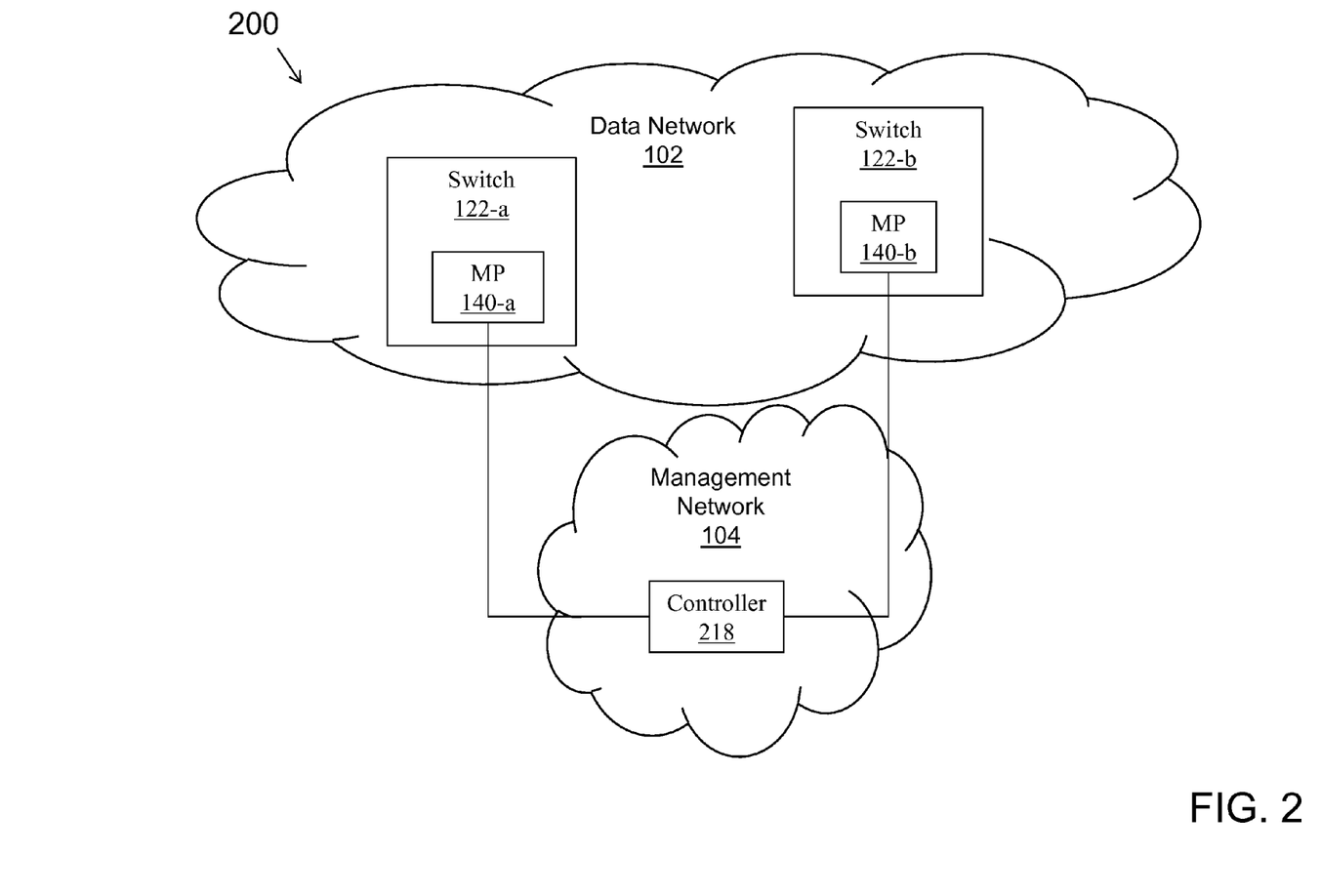
FIG. 2 depicts a computing system environment for processing workloads in conjunction with a management network in accordance with an embodiment.

As described above, the management network 104 may monitor the state of the buffers 150. More generally, the management network 104 may monitor the performance of, and manage any errors associated with, the network 102. Referring to FIG. 2, the management network may perform such monitoring and management via a controller 218. The controller 218 may report the results of the monitoring and management to one or more administrator devices (not shown).

The management network 104 may have spare capacity or bandwidth available after taking into consideration any bandwidth needed for monitoring and management purposes. This extra bandwidth may be exploited in the event that the data network 102 is over-subscribed. In this respect, as shown in FIG. 2, incoming data to be handled or processed by a first switch, e.g., switch 122-*a*, may be transmitted by the switch 122-*a* via a MP 140-*a* to the controller 218 of the management network 104. The data transmitted via the MP 140-*a* may be compressed and/or tagged with a unique ID. The controller 218 may handle or process the data on behalf of the switch 122-*a*. The results of the handling/processing may be transmitted by the controller 218 to another entity, such as a second switch, e.g., switch 122-*b*. The switch 122-*b* may include a MP 140-*b* for interfacing to the management network 104/controller 218. If the data was compressed at any point, the data may remain compressed until the last hop before the data reaches a final destination, at which point the data may be decompressed.

The switches 122 may be software-defined network (SDN) enabled switches. In this respect, data may be transferred between various entities or ports (e.g., DPs 130 and MPs 140) of a switch 122.

Figure 3:
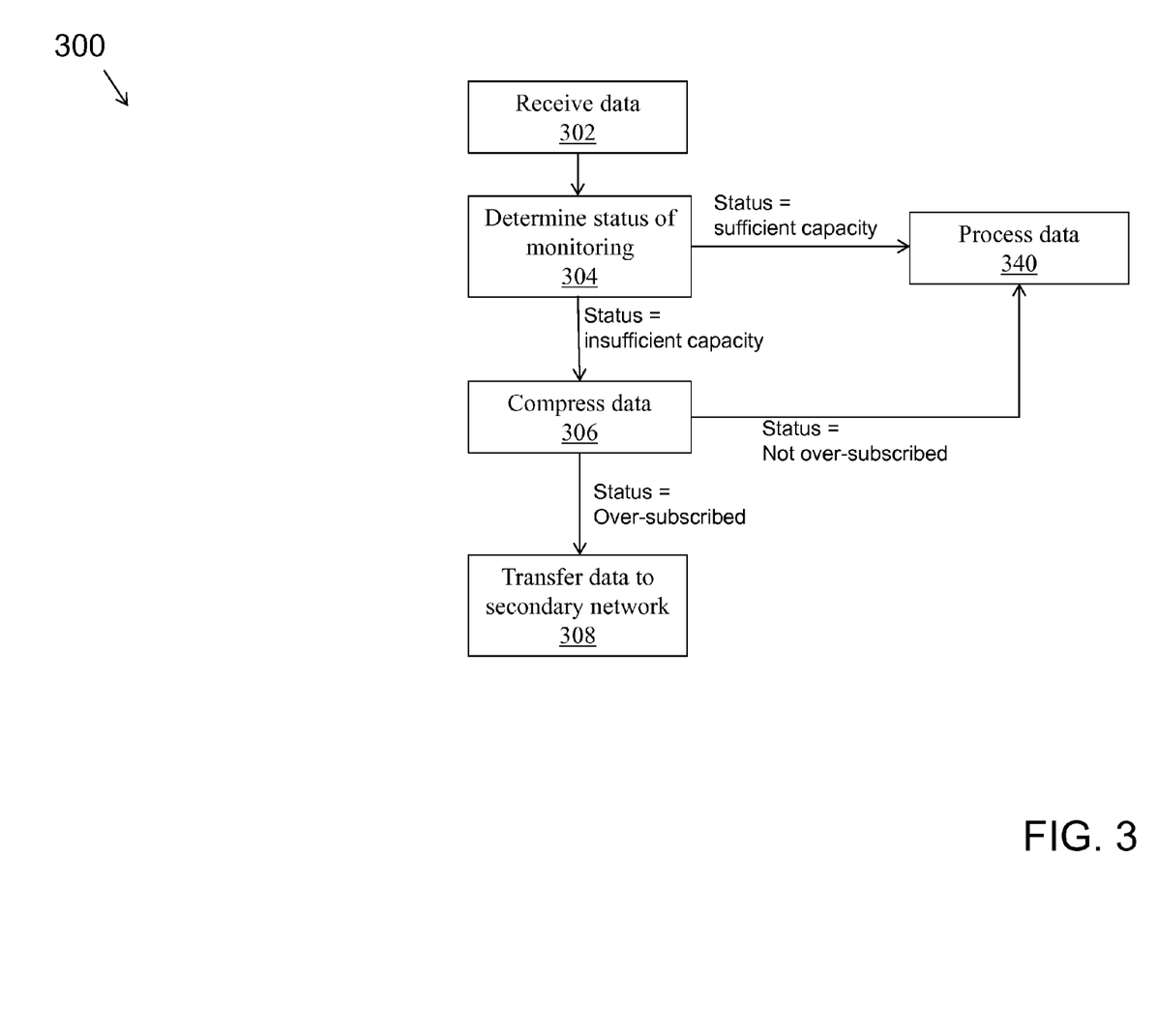
FIG. 3 depicts a process flow for processing a workload in accordance with an embodiment.

Turning to FIG. 3, a flow chart of a method 300 is shown. The method 300 may be executed by one or more systems, devices, or components, such as those described herein. The method 300 may be used to process data associated with a workload.

In block 302, data associated with a workload may be received. For example, the data may be received by a switch via a DP of the switch.

In block 304, a determination may be made regarding a status of a monitoring algorithm. For example, if the monitoring algorithm indicates that data in a buffer of the switch exceeds a threshold or that the switch is over-subscribed, flow may proceed from block 304 to block 306. Otherwise, if the monitoring indicates that the switch/buffer has sufficient capacity to accommodate ongoing data operations, flow may proceed from block 304 to block 340.

In block 306, the received data of block 302 may be compressed and/or tagged with a unique ID. As part of block 306, the compressed and/or tagged data may be stored in a buffer of the switch.

The flow from block 306 may be dictated based on the status of the monitoring of block 304. For example, if the switch is over-subscribed, flow may proceed from block 306 to block 308. Otherwise, if the switch is not over-subscribed, flow may proceed from block 306 to block 340.

In block 308, the (compressed) data may be transferred from the switch to a secondary network (e.g., a management network) for handling/processing.

In block 340, the data (e.g., compressed or uncompressed data) may be processed or handled by the switch to generate results or sub-results. As part of block 340, sub-results may be merged with sub-results associated with a common ID potentially handled by other entities, such as other switches. The merger may allow for a generation of overall results associated with a workload.

The method 300 is illustrative. In some embodiments, one or more of the blocks, or a portion thereof, may be optional. In some embodiments, additional blocks or operations not shown may be included. In some embodiments, the blocks may execute in an order or sequence that is different from what is shown in FIG. 3.

Figure 4:
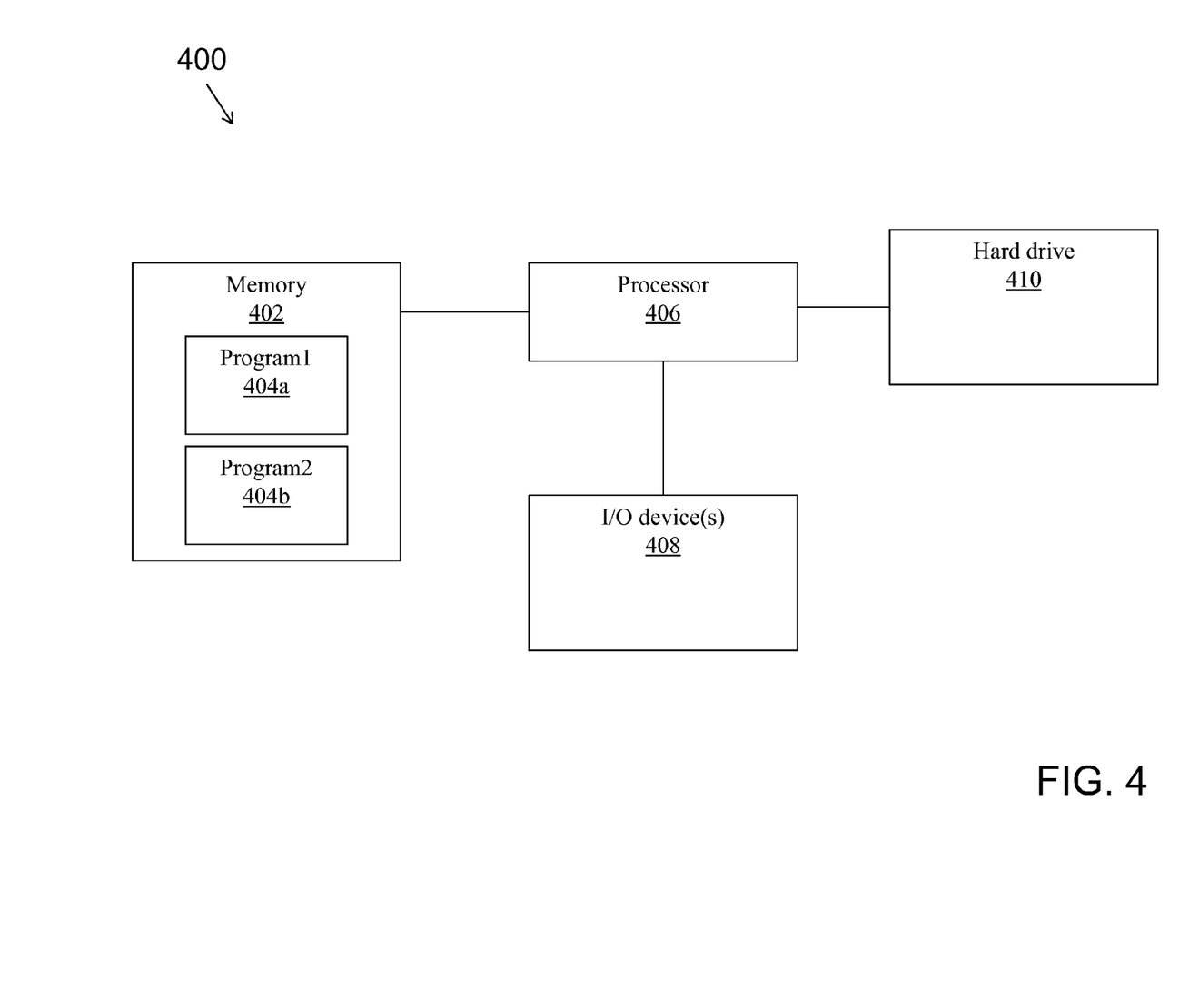
FIG. 4 depicts a computing system environment in accordance with an embodiment.

Referring to FIG. 4, an exemplary computing system 400 is shown. The system 400 is shown as including a memory 402. The memory 402 may store executable instructions. The executable instructions may be stored or organized in any manner and at any level of abstraction, such as in connection with one or more applications, processes, routines, methods, etc. As an example, at least a portion of the instructions are shown in FIG. 4 as being associated with a first program 404*a* and a second program 404*b*.

The instructions stored in the memory 402 may be executed by one or more processors, such as a processor 406. The processor 406 may be coupled to one or more input/output (I/O) devices 408. In some embodiments, the I/O device(s) 408 may include one or more of a keyboard or keypad, a touchscreen or touch panel, a display screen, a microphone, a speaker, a mouse, a button, a remote control, a joystick, a printer, etc. The I/O device(s) 408 may be configured to provide an interface to allow a user to interact with the system 400.

The processor 406 may include one or more hard drives 410. The hard drives 410 may be used to store data.

The system 400 is illustrative. In some embodiments, one or more of the entities may be optional. In some embodiments, additional entities not shown may be included. For example, in some embodiments the system 400 may be associated with one or more networks. In some embodiments, the entities may be arranged or organized in a manner different from what is shown in FIG. 4. In some embodiments, at least a portion of the system 400 may be associated with a computing device, such as a switch, a controller, or a server.

Technical effects and benefits include an ability to maximize network performance and reliability by addressing or mitigating the impact of over-subscription. Aspects of the disclosure may be applied in connection with one or more components or devices, such as a HADOOP network switch.

In some embodiments, a switch may compress shuffle data provided as input to the switch in order to reduce buffer utilization/requirements in the switch. Signatures or traffic classes may be associated with the compressed data to facilitate bandwidth allocation on available network links, potentially avoiding over-subscription. In cases where over-subscription is unavoidable, spare bandwidth associated with a secondary network may be utilized for temporary data transfer purposes.

As will be appreciated by one of average skill in the art, aspects of embodiments may be embodied as a system, method or computer program product. Accordingly, aspects of embodiments may take the form of an entirely hardware embodiment, an entirely software embodiment (including firmware, resident software, micro-code, etc.) or an embodiment combining software and hardware aspects that may all generally be referred to herein as, for example, a "circuit," "module" or "system." Furthermore, aspects of embodiments may take the form of a computer program product embodied in one or more computer readable storage device(s) having computer readable program code embodied thereon.

One or more of the capabilities of embodiments can be implemented in software, firmware, hardware, or some combination thereof. Further, one or more of the capabilities can be emulated.

An embodiment may be a computer program product for enabling processor circuits to perform elements of the invention, the computer program product comprising a computer readable storage medium readable by a processing circuit and storing instructions for execution by the processing circuit for performing a method.

The computer readable storage medium (or media), being a tangible, non-transitory, storage medium having instructions recorded thereon for causing a processor circuit to perform a method. The "computer readable storage medium" being non-transitory at least because once the instructions are recorded on the medium, the recorded instructions can be subsequently read one or more times by the processor circuit at times that are independent of the time of recording. The "computer readable storage media" being non-transitory including devices that retain recorded information only while powered (volatile devices) and devices that retain recorded information independently of being powered (non-volatile devices). An example, non-exhaustive list of "non-transitory storage media" includes, but is not limited to, for example: a semi-conductor storage device comprising, for example, a memory array such as a RAM or a memory circuit such as latch having instructions recorded thereon; a mechanically encoded device such as punch-cards or raised structures in a groove having instructions recorded thereon; an optically readable device such as a CD or DVD having instructions recorded thereon; and a magnetic encoded device such as a magnetic tape or a magnetic disk having instructions recorded thereon.

A non-exhaustive list of examples of computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM).—Program code can be distributed to respective computing/processing devices from an external computer or external storage device via a network, for example, the Internet, a local area network, wide area network and/or wireless network. The network may comprise copper transmission cables, optical transmission fibers, wireless transmission, routers, firewalls, switches, gateway computers and/or edge servers. A network adapter card or network interface card in each computing/processing device receives a program from the network and forwards the program for storage in a computer-readable storage device within the respective computing/processing device.

Computer program instructions for carrying out operations for aspects of embodiments may be for example assembler code, machine code, microcode or either source or object code written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable storage medium that can direct a computer, other programmable data processing apparatus, or other devices to function in a particular.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method performed by computer system embodied in hardware for managing workloads in a network, wherein the network comprises a data network that implements at least one of a Hadoop network switch or a software-defined network (SDN) enabled switch and an independent management network, the switch performing a method comprising:
receiving, by the switch including a buffer therein, data associated with a workload from a server, wherein the workload is part of a shuffle phase of a map-reduced algorithm;
tagging said data with a unique identifier that associates the data with the workload;
determining that the switch is not over-subscribed when second data stored in the buffer of the switch does not exceed a threshold, and determining that the switch is over-subscribed when the second data stored in the buffer of the switch exceeds the threshold, wherein the threshold is selected based on at least one of: a throughput requirement associated with said network comprises said data network and said independent management network, an anticipated maximum rate of incoming data at said at least one switch, and a capacity of said at least one buffer in said at least one switch;
compressing the received data based on determining that the second data stored in the buffer of the switch exceeds the threshold when the switch is over-subscribed;
storing, by the switch, the compressed data in the buffer; and
transmitting the compressed data and the unique identifier to a controller of said independent management network in response to determining that the switch in the data network is over-subscribed such that spare bandwidth available in said independent management network is leveraged and utilized to transfer the compressed data while the at least one switch is over-subscribed so as to manage the workload between said data network and said independent management network;
receiving, from said controller, said unique identifier and sub-results associated with a processing of said compressed data by said controller, and merging said sub-results with second sub-results identified by said unique identifier to generate overall results;
decompressing said overall results; and
transmitting said overall results to a final destination.

2. The method of claim 1, wherein the management network monitors the network for errors and monitors the network's performance.

3. The method of claim 1, further comprising:
processing the compressed data to generate sub-results.

4. The method of claim 3, further comprising:
merging the sub-results with second sub-results identified by the identifier.

5. The method of claim 1, wherein the switch is installed in a HADOOP network that includes a Hadoop Distributed File System (HDFS) serving as a storage portion and a Map Reduce serving as a processing portion.

6. The method of claim 1, wherein the switch is a software-defined network (SDN) enabled switch.

7. A computer program product executable by a computer system embodied in hardware for managing workloads in a network, the computer program product comprising:
a tangible non-transitory computer storage medium readable by a hardware processing circuit and storing instructions for execution by the processing circuit, wherein the network comprises a data network and an independent management network, the data network including a switch including a buffer, the switch comprising at least one at least one of a Hadoop network switch or a software-defined network (SDN) enabled switch that performs a method comprising:
receiving data associated with a workload from a server, wherein the workload is part of a shuffle phase of a map-reduce algorithm;
tagging said data with a unique identifier that associates the data with the workload;
determining that the switch is not over-subscribed when second data stored in a buffer of the switch does not exceed a threshold, and determining that the switch is over-subscribed when the second data stored in the buffer of the switch exceeds the threshold, the threshold selected based on at least one of: a throughput requirement associated with said network comprises said data network and said independent management network, an anticipated maximum rate of incoming data at said at least one switch, and a capacity of said at least one buffer in said at least one switch;
compressing the received data based on determining that the second data stored in the buffer exceeds the threshold when the switch is over-subscribed;
storing the compressed data in the buffer; and
transmitting the compressed data and the unique identified to said independent management network in response to determining that the switch in the data network is over-subscribed such that available bandwidth available in said independent management network is leveraged and utilized to transfer the compressed data while the at least one switch is over-subscribed so as to manage the workload between said data network and said independent management network;
receiving, from said controller, said unique identifier and sub-results associated with a processing of said compressed data by said controller, and merging said sub-results with second sub-results identified by said unique identifier to generate overall results;
decompressing said overall results; and
transmitting said overall results to a final destination.

8. The computer program product of claim 7, wherein the management network monitors the network for errors and monitors the network's performance.

9. The computer program product of claim 7, wherein the method performed by the processing circuit further comprises:
processing the compressed data to generate sub-results.

10. The computer program product of claim 9, wherein the method performed by the processing circuit further comprises:
merging the sub-results with second sub-results identified by the identifier.

11. The computer program product of claim 7, wherein the processor is associated with a switch installed in a HADOOP network that includes a Hadoop Distributed File System (HDFS) serving as a storage portion and a Map Reduce serving as a processing portion.

12. The computer program product of claim 7, wherein the processor is associated with a software-defined network (SDN) enabled switch.

* * * * *